United States Patent [19]

Kuhnert et al.

[11] Patent Number: 4,605,536
[45] Date of Patent: Aug. 12, 1986

[54] CUVETTE FOR PROJECTION DISPLAY OF CHEMICAL EXPERIMENTS

[75] Inventors: Rudi Kuhnert, Halle; Wolf-Dieter Legall, Merseburg, both of German Democratic Rep.

[73] Assignee: Veb Metaplast Quedlinburg, Quedlinburg, German Democratic Rep.

[21] Appl. No.: 614,869

[22] Filed: May 29, 1984

[51] Int. Cl.⁴ ................................................ B01L 3/00
[52] U.S. Cl. ..................................... 422/99; 356/246; 422/58; 422/130
[58] Field of Search .............................. 422/55, 58–60, 422/99, 104, 130, 310; 356/246; 434/370

[56] References Cited

U.S. PATENT DOCUMENTS

| 2,567,445 | 9/1951 | Parker | 422/55 X |
| 3,691,017 | 9/1972 | Brown et al. | 356/246 X |
| 3,751,173 | 8/1973 | Sanz et al. | 356/246 |
| 3,865,495 | 2/1975 | Sanz et al. | 356/246 |
| 3,867,042 | 2/1975 | Mayer et al. | 356/246 |
| 4,013,368 | 3/1977 | Acker et al. | 356/246 |
| 4,043,678 | 8/1977 | Farrell et al. | 356/246 |
| 4,178,345 | 12/1979 | Terk | 422/55 X |
| 4,200,613 | 4/1980 | Alfrey et al. | 422/58 X |
| 4,411,523 | 10/1983 | Blume et al. | 356/246 |

FOREIGN PATENT DOCUMENTS 99467 8/1973 German Democratic Rep. ... 422/55

Primary Examiner—Richard L. Chiesa
Attorney, Agent, or Firm—Karl F. Ross; Herbert Dubno

[57] ABSTRACT

A cuvette for the projection display of chemical experiments comprises a rectangular parallelopipedal block of transparent material, e.g. glass or a transparent synthetic resin, which is formed with one or more compartments having the shapes of chemical experiment vessels and in requisite passages communicating therewith so that complete chemical experiments can be carried out within the vessels and demonstrated by projection display.

14 Claims, 17 Drawing Figures

CUVETTE FOR PROJECTION DISPLAY OF CHEMICAL EXPERIMENTS

FIELD OF THE INVENTION

Our present invention relates to a cuvette for the display of chemical experiments and, more particularly, to an apparatus which can be utilized in conjunction with a projector for projecting an image of a chemical experiment in progress so as to enable large numbers of people to view the experiment simultaneously.

BACKGROUND OF THE INVENTION

The demonstration of chemical experiments to large audiences has been somewhat difficult in the past because, generally, such demonstrations either required the observers present to be close to the experiment, and hence the laboratory table and apparatus, or required a video transmission of the experiment to monitors which could be conveniently viewed by the individuals. Opaque projectors, overhead projectors and other apparatus, of course, have increased the ability of large numbers of observers to simultaneously view a display and indeed, such techniques have been employed for demonstrating chemical reactions within certain limits.

Because of the nature of these projectors, it has been necessary to carry out the reaction in a flat form or in a horizontal orientation of the vessel and this has, as a practical matter, limited the utility of the apparatus to the display of chemical and other reactions in watch glasses, petri dishes, crystallizing dishes and the like.

As a consequence, the types of experiments which could be carried out and displayed by projection have also been limited to those which could be carried out in such vessels and under these circumstances.

In the German Democratic Republic Patent No. WP 99,467, there is described the so-called polylux universal cuvette which has a special holder enabling it to be oriented at an angle of 22° for the display of chemical experiments and, while this has certainly broadened the field of chemical experiments which could be demonstrated utilizing projectors, it nevertheless was not fully satisfactory because the manipulation of this cuvette was complicated and it also had only limited utility.

It has been proposed to provide a vertical stage as an appropriate display, but here the projector had to be equipped with light-deflecting mirrors and tilting devices and for the most part, these vertical stages could be utilized only for the display of experiments in conventional apparatus as shadow images rather than true translumainations. In these systems, for example, the plane parallel surfaces required for true translumination for contrast images were not available.

Physics demonstrations and demonstrations of mechanical principles have been made effectively using cuvettes in the so-called diapanel system in which between the walls of the diapanel, physical actions could be demonstrated, e.g. those of a pump. For demonstration of chemical experiments, however, such systems were not suitable, at least in part because chemical experiments generally require more than one active space or compartment, and systems having more than one compartment were not available in the diapanels of the prior art.

In general, therefore, it can be said that school demonstration experiments, experiments on a semimicro basis for analytic, preparative, scientific and technological purposes in short time periods with small amounts of substances could not be effected in a manner enabling their display to large numbers of individuals utilizing conventional projecting equipment.

OBJECTS OF THE INVENTION

It is, therefore, the principal object of the present invention to provide an improved cuvette which can be utilized for the display of chemical reactions and interactions and which is both inexpensive and versatile and can be utilized with substantially standard projectors or projection systems.

Another object of this invention is to provide a cuvette for the purposes described which will obviate the drawbacks of earlier systems intended for display.

SUMMARY OF THE INVENTION

These objects and others which will become apparent hereinafter are attained, in accordance with the invention, in a cuvette which is in the form of a unitary block having plane parallel surfaces, i.e. is generally in the form of a rectangular parallelopipedal body with plane parallel surfaces and composed of a transparent material, e.g. glass or a transparent synthetic resin, which is formed with a plurality of interconnected cavities which can open at a surface of the body or can be provided within the body with passages which can open at a surface so that the body or block forms in one piece a reaction vessel with the necessary compartments of the size and shape for effecting the chemical reaction. The upright body with its upright compartments may, therefore, be directly transluminated by the projector.

Naturally, compartments within the cuvette's body can be provided in any desired arrangement or interconnection and the size and thickness of the cuvette can depend upon the number of compartments and the specifics of the demonstration to be made. To permit a high contrast projection to be obtained, the surfaces adjacent the compartments can be opacified or colored so that only the regions of the compartments are transluminated. The size of the cuvette can be varied as required by the stage of the projector and the thickness can be as small as is necessary to accommodate the reaction conditions which apply. For example, it is not difficult to provide cuvettes which have a thickness no greater than 20 mm (the desired maximum) in semimicro reactions dealing with the takeup of gases, etc.

The entire series of reactions and complete reactions such as distillations can be carried out in such cuvettes, and it has been found to be advantageous to provide throughgoing openings in the cuvettes across which a passage of the cuvette or a separate tube can be provided to allow heating or other operations external of the compartments. Naturally, the cuvettes are primarily intended for use in front of a projector for display of the reaction on a screen, but can be used also as low-cost vessels for experiments without the projector.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
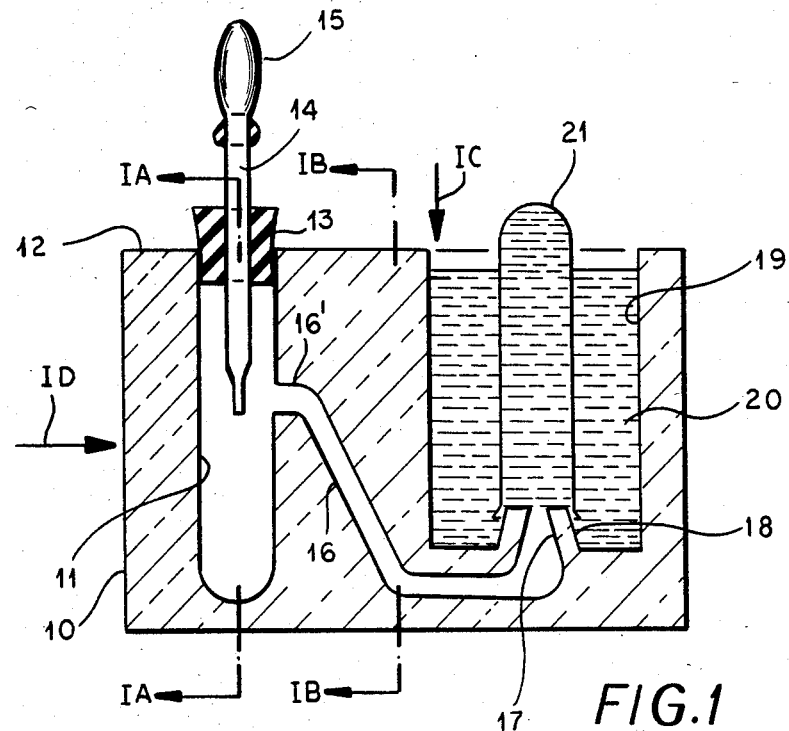
FIG. 1 is a vertical section through a cuvette, according to the invention, showing a test tube with a dropper and stopper in place.

In FIG. 1 we have shown a gas-generating and collecting cuvette which comprises a solid body 10 of transparent gas or plastic, e.g. a polymethylmethacrylate resin which is unitarily formed, i.e. provided in one piece by molding or casting, with a test-tube-shaped compartment 11 open at the upper horizontal face 12 of the parallelopipedal body. This compartment is adapted to receive a reagent, e.g. a solid reagent which can react with a liquid reagent such as an acid to produce a gas. To this end, a one-hole stopper 13 can be inserted into the mouth of the compartment 11 and can accommodate a dropper 14 whose bulb 15 can be squeezed to allow the liquid reagent to drip above the solid reagent and generate a gas which can pass through a Z-shaped passage 16, also unitarily formed in the transparent body and communicating with the compartments 11 in a stretch 16' which can be equivalent to a sidearm of a test tube.

The Z-shaped passage 16 can rise to an orifice 17 which is surrounded by a frustoconical boss 18 molded in the transparent body at the base of a compartment 19 receiving a liquid 20 and into which an inverted test tube 21, previously filled with liquid, may be placed. Accordingly, as gas is generated within the compartment 11, it passes through the Z-shaped passage 16 to rise in the test tube 21. Since the latter does not fit snugly on the boss 18, water can be displaced downwardly into the compartment 20, which forms a water trap.

Figure 1A:
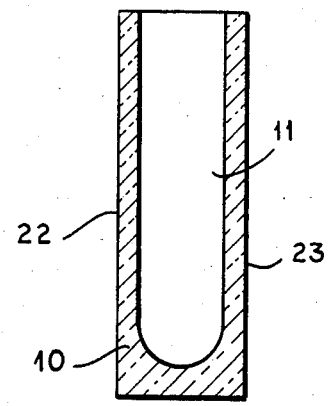
FIG. 1A is a section along line IA—IA of FIG. 1 without the stopper or dropper.
Figure 1B:
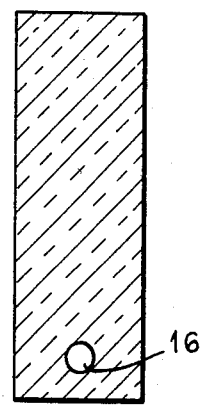
FIG. 1B is a section taken along the line IB—IB of FIG. 1.
Figure 1C:
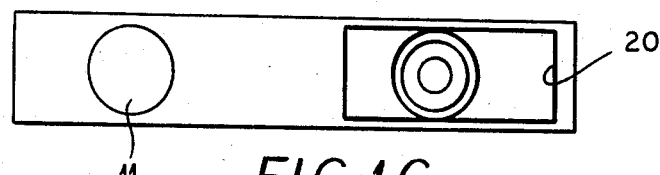
FIG. 1C is a plan view in the direction of arrow 1C of FIG. 1.
Figure 1D:
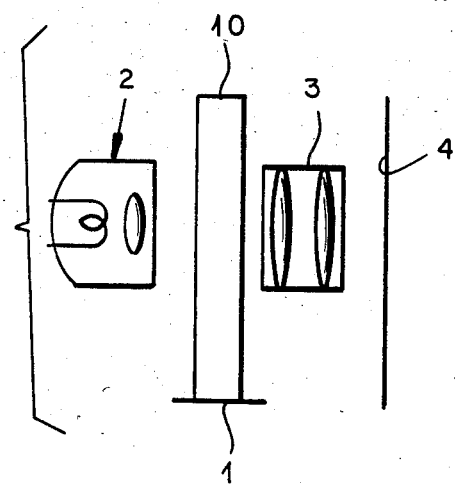
FIG. 1D is an end view in the direction of arrow 1D in FIG. 1.
Figure 1E:
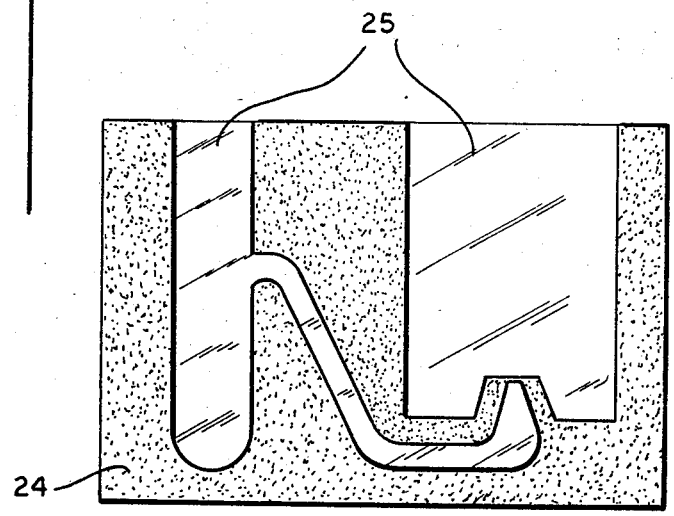
FIG. 1E is an elevational view showing one of the plane parallel surfaces of this cuvette which has been opacified to increase the contrast.

As can be seen from FIGS. 1A and 1B, the vertical broad faces 22 and 23 of the parallelopipedal body are planar and parallel to one another and may be optically smooth. The cuvette is upright and can be disposed as shown diagrammatically in FIG. 1D on a stage 1 of a projector whose projection lamp and condenser has been represented at 2 and whose projection lenses are shown at 3 to generate an image on a screen diagrammatically represented at 4. From FIG. 1E it will be apparent that the broad faces 22 and 23 can be provided with opaque coverings 24 following the outlines of the compartments and passages which remain transparent as shown at 25 so that only these regions are transluminated and a high contrast display is provided upon the screen. The cuvettes described below can be similarly used and provided with contrast surfaces.

EXAMPLE 1

Demonstration of the generation of gas and the collection thereof utilizing a water trap Into the base of the compartment 11 shown in FIG. 1, 1 gram of zinc powder is placed. Three ml of dilute hydrochloric acid is drawn into the dropper 14, 15 and the stopper 13 thereof is sealed in this compartment. The compartment 20 is filled with water, and it has been found to be advantageous to utilize water containing a small amount of a dyestuff such as methylene blue or some other readily available water soluble coloring matter. The test tube 21 which is filled with water and inverted over the boss 18 can be a semimicro reagent tube which lightly rests upon the boss 18.

The entire cuvette can be held in a semimicro stand and if a conventional semimicro clamp is used, two bores can be provided adjacent the compartment 11 to receive the round ends of this clamp. However, any other method of supporting the cuvette at the appropriate height can be utilized. The preferred projector is a polylux which is placed in a recumbent stand for the purpose of vertical projection. The hydrochloric acid is dripped slowly onto the acid, and the student watching the display can readily discern effervescence on the zinc particles and the displacement by hydrogen gas of the water in the test tube.

Figure 2:
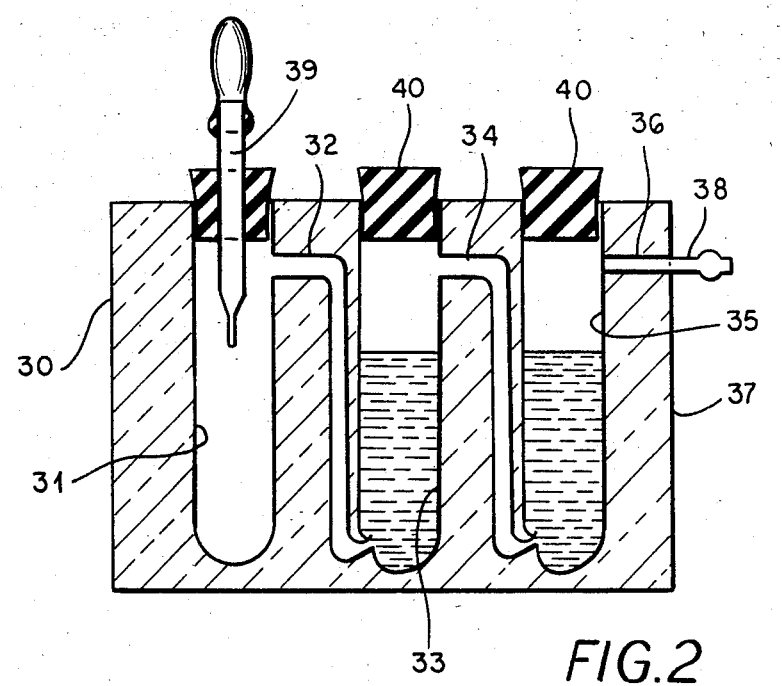
FIG. 2 is a sectional view similar to FIG. 1 showing a gas-generating apparatus utilizing two washers instead of the liquid trapped for the gas collecting test tube in FIG. 1.

In FIG. 2, a gas generating cuvette having two gas washers is provided. Here the rectangular parallelopipedal body 30 of glass or polymethylmethacrylate is formed with a reaction compartment 31 of test tube shape and communicates with a Z-shaped passage 32 beginning as a sidearm from the compartment 31 and opening into the base of a second test tube shaped compartment 33 which likewise has a Z-shaped passage 34 opening into the compartment 35. The latter can be formed with a passage 36 extending toward the end face 37 of the transparent body to which it is fused to a true sidearm 38 to which a rubber tube or the like can be attached. The compartments 33 and 35 can be partially filled with water to serve as tandem washers.

EXAMPLE 2

Demonstration of the generation of gas and washing with chemical reaction

One gram of iron (II) sulfide is placed in compartment 31 and 3 ml of 15% aqueous hydrochloric acid is dripped upon it via the dropper 39. The first gas washer 33 contains an aqueous solution of 0.1 molar lead (II) acetate to a height of 2 cm while the second gas washer contains bromine water to the same height, both gas washers being closed by the rubber stoppers 40.

The hydrogen sulfide which is generated reacts in the first washer 33 with the lead (II) ions to form a black precipitate of lead (II) sulfide. When a projection demonstration is given, the black precipitate shows as a dark shadow in the transparent solution. The yellowish-brown bromine solution is decolored as bromine is reduced to hydrogen bromide. Finally, the divided sulfur precipitates from this solution and is seen in the projection image as a slight clouding of the water. The same projection conditions are used as in Example 1.

Figure 3:
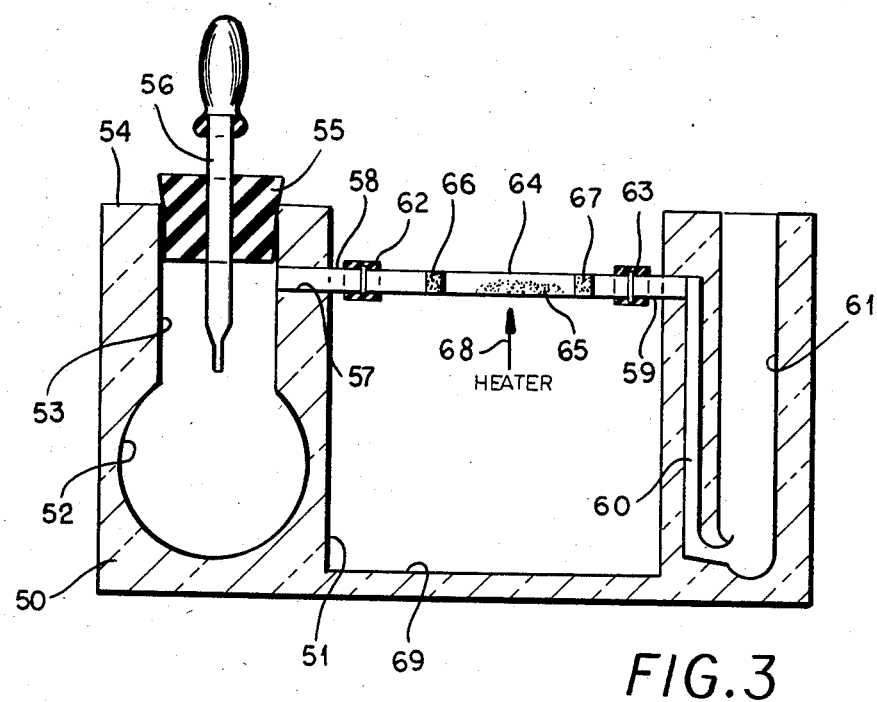
FIG. 3 is a sectional view through another cuvette provided with a means for heating the gas as it passes from one compartment to the other, this cuvette being utilized as a gas generator with a drier or reactor for the gas communicating with a gas washer or adsorber.

The cuvette shown in FIG. 3 represents a gas generator provided between the gas generating compartment and the gas washer or absorber compartment with a reaction path in which heating must be applied. In this case, while the transparent body 50 retains the outlines of a rectangular parallelopiped, it is formed with a cut-out or opening 51 between the portion provided with the two compartments. The gas generating compartment 52 here has the configuration of a round bottom flask, but is formed directly within the transparent body and has a cylindrical portion 53 analogous to the neck of such a flask opening at the upper face 54 of the body. A rubber stopper 55 provided with a dropper can be sealingly inserted into this end of the cylindrical portion 53.

The passage 57 analogous to a sidearm from this compartment is fused to a glass tube 58 in line with a glass tube 59 opening into a downwardly extending passage 60 formed unitarily in another portion of the cuvette body provided with the gas washer or absorber compartment 61 which is of test-tube configuration.

The tubes 58 and 59 are connected by rubber sleeves 62 and 63 with a heat-resistant reactor tube 64 which can contain a reactant 65 between porous plugs 66 and 67, e.g. of stainless steel wool. Any conventional heating means such as a microburner can be provided as represented at 68 to heat the tube 64.

EXAMPLE 3

Demonstration of gas generation and displacement of a light gas by a heavy gas and reaction of a gas with a liquid Two grams of calcium carbonate are introduced into the round bottom chamber 52 and dilute hydrochloric acid is dripped upon it from the dropper 56 after the stopper 55 has been inserted in a gas-tight manner. The gas washer 61 can contain milk of lime, i.e. a 5 ml calcium hydroxide solution. As hydrochloric acid is dripped onto the calcium carbonate, carbon dioxide is generated which displaces gas above the carbon dioxide and bubbles can be seen to rise in the absorber solution in the compartment 61, thereby demonstrating the displacement of a light gas with a heavy gas. No other visible change can be observed in the absorber compartment until the carbon dioxide reaches the lime water. With the formation of calcium carbonate in the lime water, a white precipitate can be observed.

The reactant 65 can be a dryer which absorbs moisture from the gas.

It is possible to provide the apparatus of FIG. 3 with a T connection and a two-way valve at the tube 58. In this case, a downwardly extending stem of the T connection can bubble the carbon dioxide directly into a calcium hydroxide solution in a square-cross section cylinder mounted above the cross piece 69 connecting the portions of the cuvette having the compartments. This demonstrates that carbon dioxide is heavier than air. When the valve is rotated, the gas can be transmitted via the reactor tube 64 to the gas washer 61. A projection demonstration is given in the same manner as in Example 1.

Figure 4:
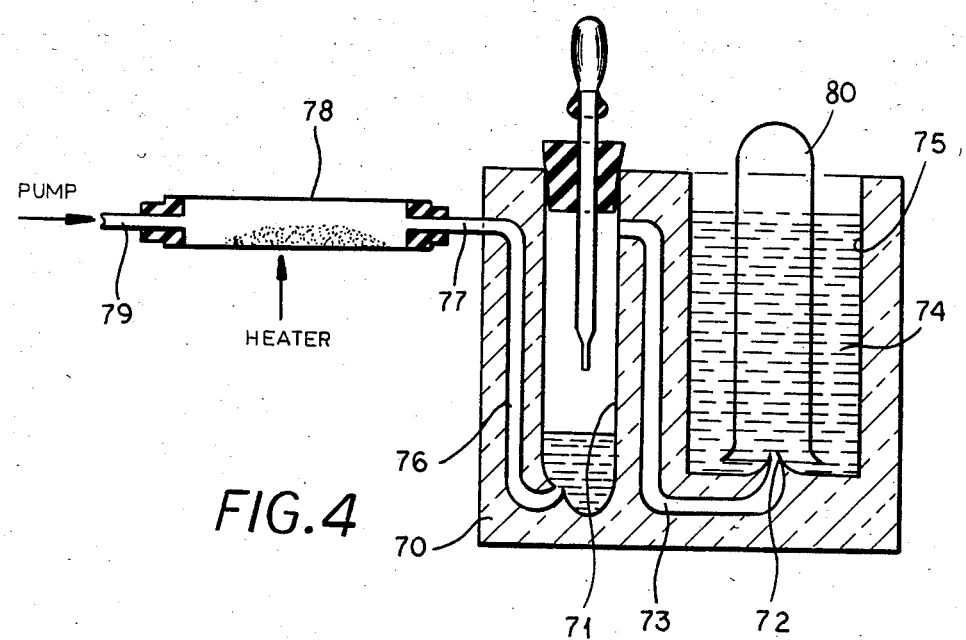
FIG. 4 is a sectional view through a cuvette provided with a reactor and adapted to carry out a reaction in which a gas is introduced into the reaction compartment and the reaction product is collected in a liquid trap.

In the embodiment of FIG. 4, the cuvette 70 is similar to that provided in FIG. 1, except that the reactor compartment 71, which is connected to the orifice 72 by a Z-shaped passage 73 to deliver the gas below the level of the water 74 in the compartment 74, is provided with a further Z-shaped passage 76 which opens into the bottom of the compartment 71 and can be connected via a tube 77 to a reactor 78 connected to a pump 79. This system can be used to produce gas in the reactor 78, to wash the gas in the compartment 71 and to collect the gas in a test tube 80 via a water trap as has been described in connection with FIG. 1.

EXAMPLE 4

Demonstration of the characteristics of metallurgical gases

The combustion tube forming the reactor 78 is supplied with a little pyrite and is heated. A pump supplies air through the combustion tube. In the compartment 71 dilute potassium permanganate solution slightly acidified with sulfuric acid is provided. The water trap is filled with water and a water filled semimicro reagent tube is inverted at 80 over the opening 72. It is also possible to fill the water trap to ¼ of its height with a barium hydroxide solution to demonstrate the formation of barium sulfite as the sulfur oxide gas enters the water trap. The barium sulfite precipitates.

The air passing over the heated pyrite forms a reaction mixture which oxidizes in the permanganate solution and causes the formation of the sulfite in the water trap.

Figure 5:
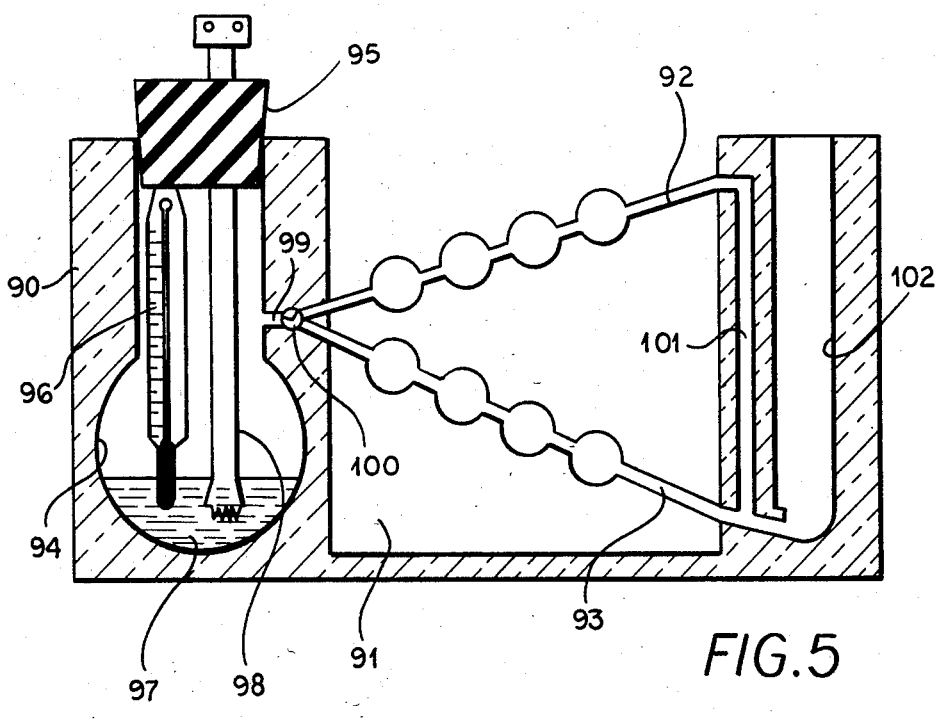
FIG. 5 is a section through a cuvette for effecting reaction between liquid components and showing how the heating and temperature measurement can be carried out while reflux or condenser cooling can be provided.

In FIG. 5 we show a reactor based upon the principles already described but demonstrating reactions of liquid components with in situ electrical heating and selective use of a condenser and a reflux system. Here again the rectangular parallelopipedal body 90 is cut away at 91 so that a pair of glass microcondensers 92 and 93 can be provided.

The reaction vessel is here formed by a round bottom compartment 94 whose two-hole stopper 95 receives a thermometer 96 which can be transluminated to show its reading and has its bulb immersed in the reagents 97 within this compartment. An electric heater 98 also extends through the rubber stopper and has its heating element immersed in the solution. A passage 99 forming a sidearm from this compartment communicates with a three-position valve 100 which can selectively connect the compartment 94 with the upwardly inclined condenser 93 for distillation, both condensers being air cooled. The condenser 92 opens into a downwardly extending passage 101 formed in the body and communicating at its bottom with a collection compartment 102 with which the condenser 93 also communicates.

EXAMPLE 5

Demonstration of reflux distillation and recovery distillation

Utilizing the cuvette shown in FIG. 5, 5 ml of ethanol, 5 ml of acetic acid and 5 drops of concentrated sulfuric acid are introduced into the compartment 94 which is closed in a gas-tight manner with the stopper 95.

Initially the valve 100 connects the reflux condenser 92 to the vessel and heating is commenced to allow refluxing for about three minutes. The valve is then switched over and the acetic acid ethyl ester is driven off and collected in vessel 102. The compartment 102 can be filled with water which can be displaced by the acetic acid ethyl ester. The display is effected in the same manner as in Example 1.

Figure 6:
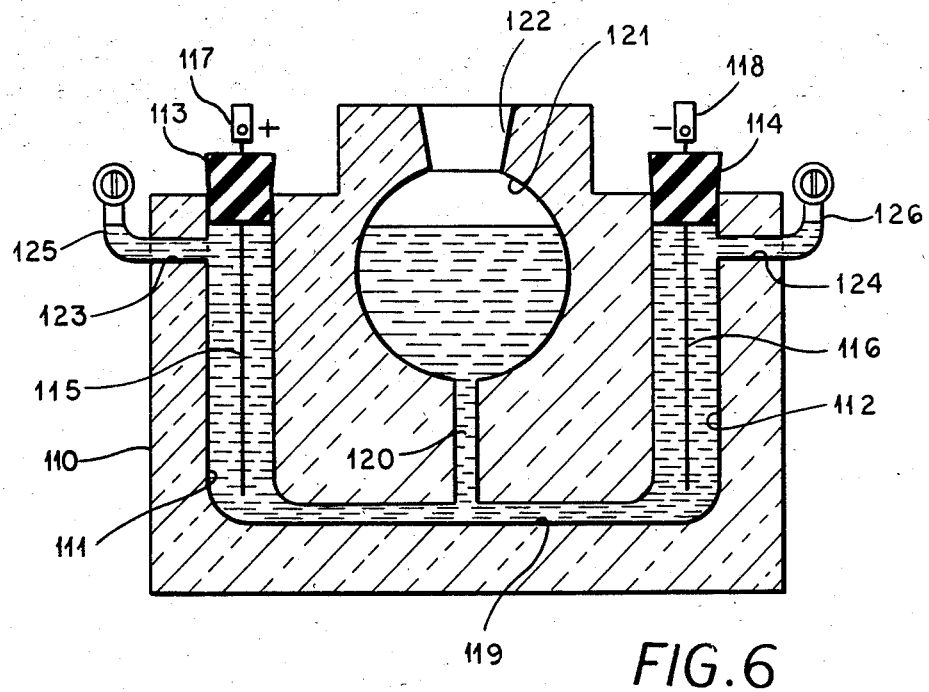
FIG. 6 is a section through a cuvette operating as an electrolysis cell.

FIG. 6 shows a cuvette which is utilized to carry out an electrolysis to demonstrate gas generation. This transparent body 110 is provided with a pair of upright compartments 111 and 112 opening at the upper surface of the cuvette and closed by respective stoppers 113 and 114, each of which is provided with an electrode 115, 116 connectable by terminals 117, 118 to a direct current source.

The compartments 111 and 112 are interconnected by a transparent passage 119 molded into the transparent body and formed with an upright passage 120 terminating at the base of a flask-shaped compartment 121 whose mouth 122 is open at the upper side of the cuvette. Lateral passages 123 and 124 are provided for each compartment 111, 112 and communicate with fittings 125 and 126 which can be utilized to connect the compartments to any conventional gas collectors, e.g. the collector of FIG. 8.

EXAMPLE 6

Demonstration of electrolysis

The compartment 121 is filled with dilute sulfuric acid and a direct current voltage of 10 volts is applied to produce electrolysis. As long as the valves at the ends of the arms 125 and 126 are closed, the quantitively different gas volumes building up in the anode compartment 111 and the cathode compartment 112 will be readily visible because the hydrogen and oxygen will displace the liquid in these compartments in accordance with the volumes with which they are generated by electrolysis of water.

The valves can be opened to enable collection of the gases and sampling. The display is effected in the same manner as in Example 1.

Figure 7:
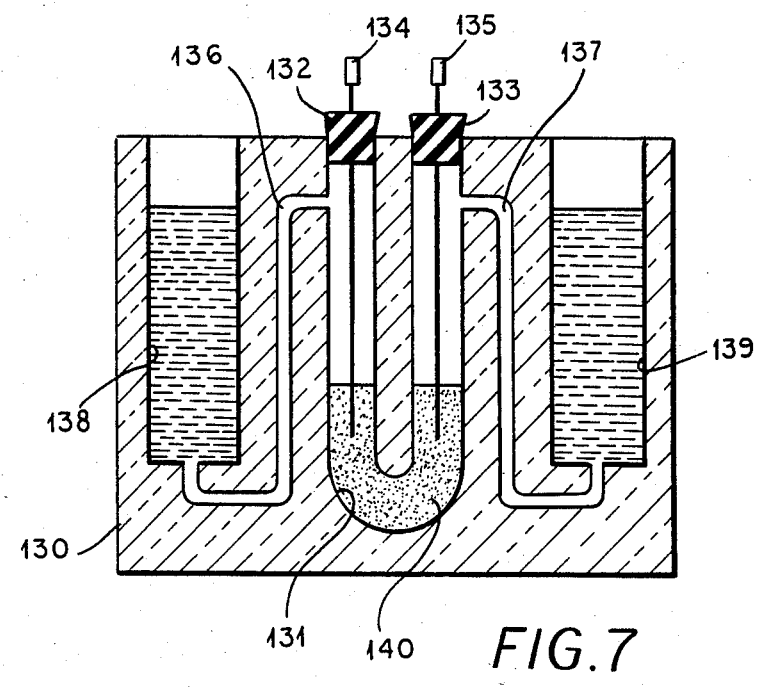
FIG. 7 is a section through a cuvette in which the electrolysis cell has the configuration of a U tube and which also allows the measurement of gases generated and can be used with or without diaphragms.

FIG. 7 shows a cuvette which is also utilized to demonstrate electrolysis, but here the rectangular parallelopipedal body 130, which has the overall outline and shape of the body described in FIG. 1, is formed with three compartments.

A compartment 131 in the configuration of a U tube, has its mouths opening at the upper surface of the body 130 and closed by respective stoppers 132 and 133 carrying the anode 134 and the cathode 135, respectively.

Respective Z-shaped passages 136 and 137 connect arms of the compartment 131 to the compartments 138 and 139 which likewise open at the top of the cuvette.

EXAMPLE 7

Demonstration of electrolysis for conductivity of solutions with and without diaphragm A roll of cotton wadding 140 is introduced into the bend of the U compartment 131 so that as with subsequent filling of a liquid into this compartment, the wadding will act as a porous barrier. The U compartment is filled to just below the passages 136, 137 with one molar aqueous sodium chlorate solution. The compartment is then closed by the stoppers and the electrodes are connected to a dc source at 10 volts and electrolysis is carried out. The hydrogen generated in the cathode chamber bubbles through the liquid in compartment 139 and are collected via a water dropper in a semimicro reagent tube in the manner described and demonstrated by bringing it near a lighted splint or flame to generate the standard "pop". The anode compartment is provided with a few drops of potassium iodide/starch solution so that the coloring generated there displays a colored reaction. The same device is used but demonstrates the separation of different solutions by the diaphragm and the development of potential differences with appropriate electrodes. The display is effected in the same manner as described in Example 1.

Figure 8:
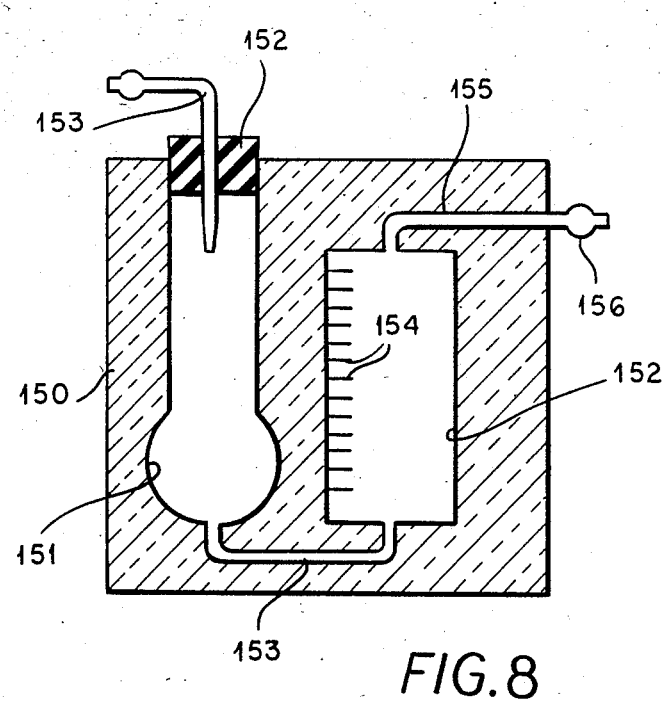
FIG. 8 is a section through a cuvette according to the invention which integrates a gas measuring and gas accumulating device for the quantitative measurement and storage of gases.

FIG. 8 shows a gas-measuring and collecting unit for the collective measurement and storage of gases. Here the rectangular parallelopipedal body 150 is formed with a compartment 151 having the shape of a drying tube which is closed with a one-hole stopper 152 through which a glass tube 153 extends. The bottom of compartment 151 is connected to a cylindrical compartment 152 by a passage 153 molded into the body 150. The external wall of the cuvette may be provided with graduations 154 representing the level in the compartment 152.

The upper end of the compartment 152 is formed with a passage 155 to which a connecting tube 156 is fused.

EXAMPLE 8

Demonstration of quantitive gas measurement or withdrawal of stored gases

The compartment 151 of the cuvette of FIG. 8 is competely filled with liquid and this liquid is then driven into the measuring compartment. The upper tube 153 is then closed with a squeeze clamp in a gas-tight manner. The device is then connected to a gas-generating apparatus, e.g. of the type shown in FIG. 11 and the total quantity of gas generated by a given quantity of solid is measured by connecting the gas generator to the gas-collecting cuvette. Naturally, instead of utilizing a solid as the source of the generation of the gas, a liquid of known concentration can be utilized.

When the cuvette of FIG. 8 is utilized as a gas collection-apparatus, the stored gas can be released into another cuvette, e.g. the cuvette of FIG. 4. Demonstration is effected utilizing the technique described in connection with Example 1.

Figure 9:
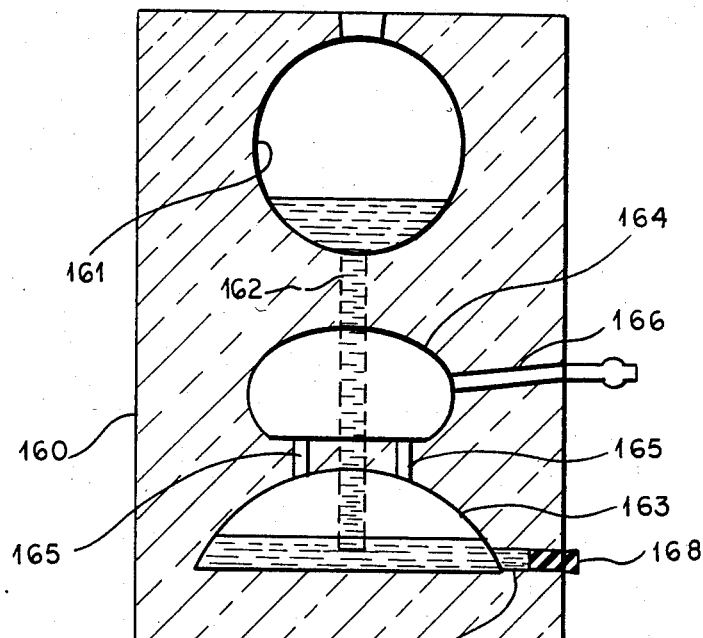
FIG. 9 is a section through a Kipp apparatus for the generation of gas.

FIG. 9 shows a Kipp-type gas generating apparatus which comprises a body 160 of transparent material which is formed unitarily with a compartment 161 in the form of a reservoir which communicates with a passage 162 opening into a lower compartment 163 which, in turn, communicates with an intermediate compartment 164 via passages 165, the compartment 164 having an outlet 166. A drain 167 can be closed by a stopper 168.

EXAMPLE 9

Demonstration of a Kipp gas generator has a self-regulating gas producer

The Kipp generator of FIG. 9 is used as a self-controlling gas producer and allows the continuous production of gas which can be trapped by the passage 166 into the cuvette of FIG. 4, for example.

The compartment 163 is here filled with a granular manganese dioxide ore and the compartment 161 with 5% aqueous hydrogen peroxide solution. When oxygen generation exceeds demand, the inflow of the hydrogen peroxide solution is restricted. When gas withdrawal is increased, the flow of hydrogen peroxide is likewise increased. The oxygen can be utilized for the reaction with metals or nonmetals in the combustion tube of cuvette 4 with the gaseous products being then passed into a gas washer, and if desired, collected in a water trap as previously described. The display is effected in the manner described in connection with Example 1.

Figure 10:
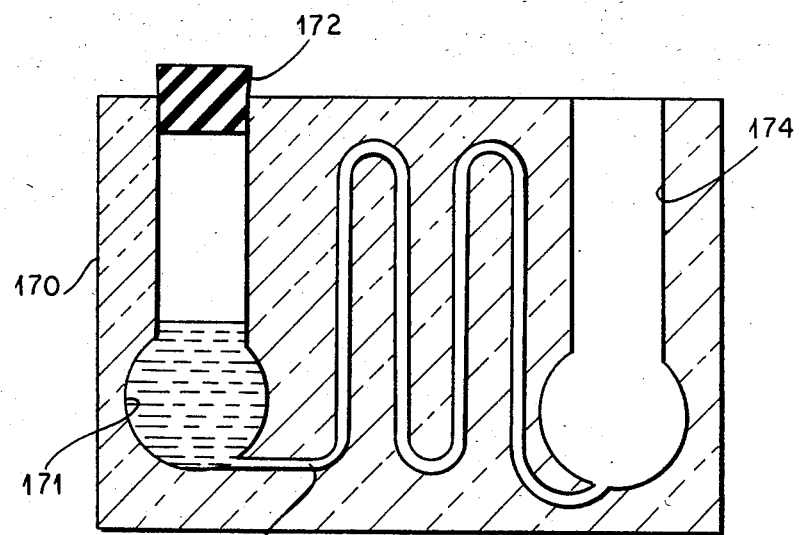
FIG. 10 is a section through a cuvette forming an apparatus for measuring reaction speed.

FIG. 10 shows an apparatus for measuring reaction velocities and comprises the transparent block 170 which is provided with the compartment 171 closed by the rubber stopper 172 and an undulating passage 173 connecting this compartment to a further compartment 174.

EXAMPLE 10

Demonstration of reaction velocities

The right hand compartment 174 of the apparatus of FIG. 10 is closed with a rubber stopper. Into the reaction compartment at the left hand side at 171 a measured volume of a liquid or solution is introduced. The substance with which this liquid phase is to react is then added and the stopper 172 is applied and the stopper of the compartment 174 is removed. The time it takes to drive the liquid through a predetermined distance can then be measured and is an indication of the reaction velocity. The same device can be used to measure the rates at which equal volumes of different alkanols can react with the same quantity of sodium and the different reaction velocities can be collectively displayed utilizing the table described in connection with Example 1.

Figure 11:
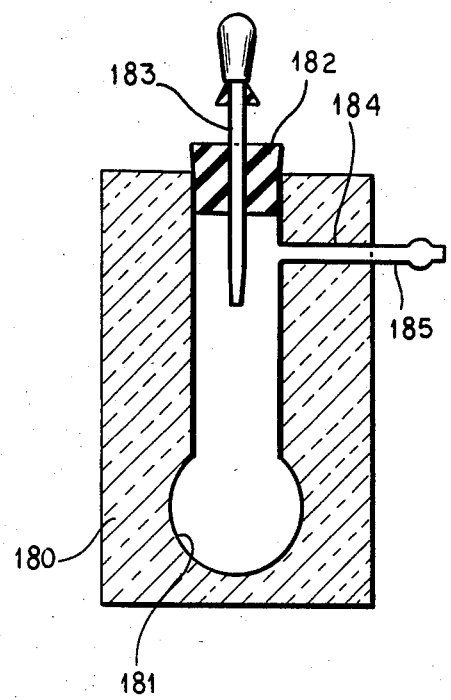
FIGS. 11 and 12 are sections through cuvettes which can be combined with any of the cuvettes previously described.

FIG. 11 shows a cuvette which can be utilized as a gas generator in combination with other cuvettes, e.g. as previously described or as shown in FIG. 11 and comprises the transparent rectangular parallelopipedal body 180 provided with the reaction compartment 181, the stopper 182 and the dropper 183 as previously described (see FIG. 1). A side passage 184 from this reactor is provided with a connecting tube 185.

EXAMPLE 11

Demonstration of gas generation and transfer of the gas to another cuvette with a color reaction in solution In the manner described, gas is generated by dripping a liquid onto a solid substance in the compartment 181. This is displayed by vertical projection utilizing a projector as described. The reactor is connected to the cuvette of FIGS. 8, 12 or 4 to demonstrate color reactions or for further reaction.

Figure 12:
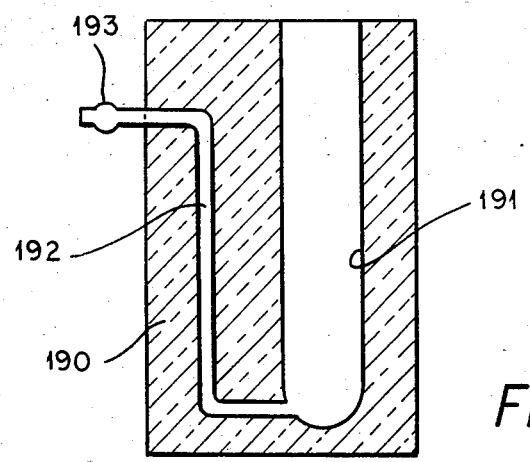

FIG. 12 illustrates a cuvette in which the body 190 of transparent material has a single compartment 191 provided with a Z-shaped passage 192 communicating with a connecting tube 193 which can be tied to other apparatus. Typical apparatus can be the cuvettes of FIGS. 8, 9 and 11 as has already been described, projection being effected similarly.

We claim:

1. A cuvette for demonstrating chemical experiments which comprises an elongated rectanguler parallelopipedal block of transparent material formed unitarily with plane-parallel broad surfaces transluminable for projection display and with parallel upper and lower surfaces, said block being formed between said broad surfaces with a plurality of upright vertically elongated compartments, at least one of which is upwardly open of the shape of chemical experiment vessels, spaced apart in said block, means defining in the material of said block at least one elongate passage communicating between said compartments and terminating in lateral or bottom walls of said compartments at opposite ends at respective ones of said compartments, the walls of said compartments and said passage being defined exclusively by said material unitarily with said block, and means on said block for inducing a chemical reaction in at least one of said compartments, all of said compartments opening at said upper surface.

2. The cuvette defined in claim 1 wherein at least one of said compartments is provided with a further passage formed in said block and constituting a sidearm thereof.

3. The cuvette defined in claim 1 wherein said passage has generally a Z shape.

4. The cuvette defined in claim 1 wherein said passage has an undulating configuration within said block.

5. The cuvette defined in claim 1 wherein said block is formed with a cutout separating two portions, said compartment being in one of said portions, the other of said portions being provided with another compartment, further comprising means bridging said cutout between said portions to interconnect said compartments.

6. The cuvette defined in claim 5 wherein said block has a maximum thickness of about 20 mm and is composed of glass or a transparent synthetic resin.

7. The cuvette defined in claim 5 wherein said means includes a combustion tube which can be externally heated.

8. The cuvette defined in claim 7 wherein said block has a maximum thickness of about 20 mm and is composed of glass or a transparent synthetic resin.

9. The cuvette defined in claim 1 wherein said compartment has a shape of a test tube.

10. The cuvette defined in claim 9 wherein said block has a maximum thickness of about 20 mm and is composed of glass or a transparent synthetic resin.

11. The cuvette defined in claim 1 wherein said compartment has a shape of a round bottom flask with a narrow neck.

12. The cuvette defined in claim 11 wherein said block has a maximum thickness of about 20 mm and is composed of glass or a transparent synthetic resin.

13. The cuvette defined in claim 1 wherein said compartment forms a reservoir for a liquid and is provided with an opening at its bottom for discharging gas into a vessel inserted into said compartment and forming a liquid trap therein.

14. The cuvette defined in claim 13 wherein said block has a maximum thickness of about 20 mm and is composed of glass or a transparent synthetic resin.

* * * * *